US009896353B2

(12) United States Patent
Guo et al.

(10) Patent No.: US 9,896,353 B2
(45) Date of Patent: *Feb. 20, 2018

(54) HYDROCARBON WASTE STREAM PURIFICATION PROCESSES USING MICROPOROUS MATERIALS HAVING FILTRATION AND ADSORPTION PROPERTIES

(71) Applicant: PPG Industries Ohio, Inc., Cleveland, OH (US)

(72) Inventors: Qunhui Guo, Murrysville, PA (US); James C. Peters, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/299,880

(22) Filed: Oct. 21, 2016

(65) Prior Publication Data

US 2017/0129789 A1    May 11, 2017

Related U.S. Application Data

(63) Continuation-in-part of application No. 14/193,902, filed on Feb. 28, 2014, now Pat. No. 9,546,326, which
(Continued)

(51) Int. Cl.
*C02F 1/44* (2006.01)
*B01D 61/14* (2006.01)
(Continued)

(52) U.S. Cl.
CPC .......... *C02F 1/444* (2013.01); *B01D 17/0202* (2013.01); *B01D 17/085* (2013.01);
(Continued)

(58) Field of Classification Search
CPC .. B01D 2311/04; B01D 17/085; B01D 61/18; C02F 1/444; C02F 2101/32
See application file for complete search history.

(56) References Cited

U.S. PATENT DOCUMENTS 2,940,830 A    6/1960   Thornhill
4,229,297 A   10/1980   Nohmi et al.
(Continued)

FOREIGN PATENT DOCUMENTS

DE    3545615 A1    7/1986
EP    0188119 A1    7/1986
(Continued)

*Primary Examiner* — Ana Fortuna
(74) *Attorney, Agent, or Firm* — The Webb Law Firm

(57) ABSTRACT

The present invention is directed to methods of treating a hydrocarbon-containing waste stream to form a hydrocarbon-containing retentate and an aqueous permeate which is substantially free of hydrocarbon. The method includes passing the hydrocarbon-containing waste stream through a microporous membrane to yield the hydrocarbon-containing retentate and the aqueous permeate. The membrane comprises a substantially hydrophobic, polymeric matrix and substantially hydrophilic, finely divided, particulate filler distributed throughout the matrix. The polymeric matrix has pores with a volume average diameter less than 1.0 micron, and at least 50 percent of the pores have a mean diameter of less than 0.35 micron.

16 Claims, 2 Drawing Sheets

Related U.S. Application Data is a continuation-in-part of application No. 13/599,221, filed on Aug. 30, 2012, now abandoned.

(60) Provisional application No. 61/555,500, filed on Nov. 4, 2011.

(51) Int. Cl.

| | | |
|---|---|---|
| *B01D 69/14* | (2006.01) | |
| *C10G 33/06* | (2006.01) | |
| *B01D 71/26* | (2006.01) | |
| *C02F 1/28* | (2006.01) | |
| *B01D 17/02* | (2006.01) | |
| *C02F 1/40* | (2006.01) | |
| *B01D 17/00* | (2006.01) | |
| *B01D 67/00* | (2006.01) | |
| *C08L 23/06* | (2006.01) | |
| *C02F 101/32* | (2006.01) | |
| *C02F 103/10* | (2006.01) | |
| *B01D 71/02* | (2006.01) | |

(52) U.S. Cl.
CPC ......... *B01D 61/145* (2013.01); *B01D 61/147* (2013.01); *B01D 67/002* (2013.01); *B01D 67/003* (2013.01); *B01D 67/0027* (2013.01); *B01D 69/148* (2013.01); *B01D 71/26* (2013.01); *C02F 1/281* (2013.01); *C02F 1/40* (2013.01); *C08L 23/06* (2013.01); *C10G 33/06* (2013.01); *B01D 71/027* (2013.01); *B01D 2323/06* (2013.01); *B01D 2323/12* (2013.01); *B01D 2323/21* (2013.01); *B01D 2325/02* (2013.01); *B01D 2325/24* (2013.01); *C02F 2101/32* (2013.01); *C02F 2103/10* (2013.01); *C10G 2300/1033* (2013.01)

(56) References Cited

U.S. PATENT DOCUMENTS

| | | | | |
|---|---|---|---|---|
| 4,335,193 A | * | 6/1982 | Doi | ............... C08J 9/0066 210/500.36 |
| 4,670,341 A | | 6/1987 | Lundsager | |
| 4,684,457 A | | 8/1987 | McKechnie et al. | |
| 4,833,172 A | | 5/1989 | Schwarz et al. | |
| 4,861,644 A | * | 8/1989 | Young | ............... B29C 55/005 101/450.1 |
| 5,196,262 A | | 3/1993 | Schwarz et al. | |
| 5,207,915 A | * | 5/1993 | Hagen | ............... B01D 15/08 210/635 |
| 5,248,428 A | | 9/1993 | Hagen et al. | |
| 5,911,883 A | | 6/1999 | Anderson | |
| 6,387,271 B1 | | 5/2002 | Geibel et al. | |
| 6,471,869 B1 | * | 10/2002 | Yanou | ............... B01D 61/14 210/195.2 |
| 7,211,322 B2 | | 5/2007 | Pekala | |
| 8,454,829 B2 | | 6/2013 | Yaeger | |
| 8,802,273 B2 | | 8/2014 | Takita et al. | |
| 9,546,326 B2 | * | 1/2017 | Guo | ............... C10G 33/06 |
| 2004/0222156 A1 | | 11/2004 | Yu et al. | |
| 2005/0023212 A1 | | 2/2005 | Inoue et al. | |
| 2006/0121269 A1 | * | 6/2006 | Miller | ............... B01D 67/0027 428/317.9 |
| 2006/0272499 A1 | | 12/2006 | Miller et al. | |
| 2010/0264068 A1 | | 10/2010 | Ikebe et al. | |
| 2010/0323573 A1 | | 12/2010 | Chu et al. | |
| 2011/0089013 A1 | * | 4/2011 | Sakurai | ............... B01D 17/0205 201/2 |
| 2011/0256364 A1 | | 10/2011 | Boyer et al. | |
| 2012/0145468 A1 | | 6/2012 | Pekala et al. | |
| 2013/0228529 A1 | | 9/2013 | Guo et al. | |

FOREIGN PATENT DOCUMENTS

| | | |
|---|---|---|
| EP | 2065432 A1 | 6/2009 |
| GB | 2014184 A | 8/1979 |
| JP | 6211506 A | 1/1987 |
| JP | 6358602 U | 4/1988 |
| JP | 63295650 A | 12/1988 |
| JP | 525305 A | 2/1993 |
| JP | 11138163 A | 5/1999 |
| JP | 2001502958 A | 3/2001 |
| JP | 2002128943 A | 5/2002 |
| JP | 2004523088 A | 7/2004 |
| JP | 2004275845 A | 10/2004 |
| JP | 2007106992 A | 4/2007 |
| JP | 2008272636 A | 11/2008 |
| JP | 201386062 A | 5/2013 |
| KR | 1020070085740 A | 8/2007 |
| RU | 2026725 C1 | 1/1995 |
| WO | 2007001405 A2 | 1/2007 |
| WO | 2013066488 A1 | 5/2013 |

\* cited by examiner

HYDROCARBON WASTE STREAM PURIFICATION PROCESSES USING MICROPOROUS MATERIALS HAVING FILTRATION AND ADSORPTION PROPERTIES

CROSS-REFERENCE TO RELATED APPLICATIONS

This application is a continuation-in-part of U.S. patent application Ser. No. 14/193,902, filed Feb. 28, 2014, entitled "FLUID EMULSION PURIFICATION PROCESSES USING MICROPOROUS MATERIALS HAVING FILTRATION AND ADSORPTION PROPERTIES", incorporated by reference herein in its entirety, which is a continuation-in-part of U.S. patent application Ser. No. 13/599,221, filed Aug. 30, 2012, entitled "MICROPOROUS MATERIAL HAVING FILTRATION AND ADSORPTION PROPERTIES AND THEIR USE IN FLUID PURIFICATION PROCESSES", incorporated by reference herein in its entirety, and which in turn claims the benefit of U.S. Provisional Patent Application No. 61/555,500, filed on Nov. 4, 2011, incorporated by reference herein in its entirety.

FIELD OF THE INVENTION

The present invention relates to hydrocarbon-containing waste stream purification processes using microporous materials having filtration and adsorption properties.

BACKGROUND OF THE INVENTION

According to the Department of Energy, 21 billion gallons of co-produced water are drawn up by oil and gas wells each year in the United States. Natural "oil" from a well is actually a multiphase fluid of oil/water/gas. Generally, all three fluids are found in every hydrocarbon well and well effluent.

Because of its value and because of environmental concerns, oil needs to be separated from this effluent. This is usually done through gravitational settling in large tanks, which requires capital and significant space that is not always available onsite. Gas is separated easily in a mechanical separator or by pressure reduction within storage containers. In the case of heavy oils and many emulsified fluid systems, the raw fluids are heated to change the density of the oil and water by heating off lighter ends and essentially agitating their molecular structures so that these fluids can more easily separate. Water then is a byproduct.

While co-produced water is common, it is a hazardous waste that is very burdensome to operators and must be disposed of, sometimes with difficulty. Water that historically may have been sent down a creek or into a wooden barrel now has to be piped into very large storage containers. Offshore, those containers are attached to topsides or hooked by hoses to older, refitted storage ships. This waste water is stored for days to separate oil from water. The resulting aqueous product still contains some oil and other possible contaminants. Not only is this procedure costly, it is time consuming, risky, and energy consumptive. In an offshore subsea environment, water storage containers are not feasible.

Current topsides water-oil separation processes are slow, environmentally unfriendly, and consume a large amount of energy in heating. The final residual water must be disposed and cannot be released directly into the ocean. Stored water often must be treated by chemicals to reduce phase surface tensions and induce separation, creating further risk from chemical handling and possible spills. Volumes of produced water offshore can be in the thousands of barrels per day per well. Processing facilities generally are a large part of an ongoing footprint. Co-produced water is frequently re-injected into the subsurface because topsides storage is a non-trivial issue. Sufficient removal of controversial chemicals and residual oil before any disposal is a process concerning regulators, such as the U.S. Environmental Protection Agency (EPA).

In subsea operations, as noted above, there is simply no large volume water storage option available to industry. Separation is ineffective: a significant amount of water-in-oil remains in solution after subsea separation, resulting in inefficient separation and ultimately in lower hydrocarbon recoveries. More critically, oil-in water concentrations are high (in the range of 5 percent) because of a lack of sufficient residence time, which will result in crude oil injection into disposal wells along with produced water. Consequently, the disposal zones eventually plug and become ineffective for additional disposal. Additionally, the oil-in-water that is pumped into disposal zones is lost product and revenue to both the operating companies and to the Federal government from royalties.

It would be desirable to provide a simple, inexpensive technique that can overcome the aforementioned deficiencies. Such a technique can save the industry hundreds of millions of dollars in operating and maintenance costs, and increase revenues besides saving space. Additionally, that method can eliminate many environmental concerns.

SUMMARY OF THE INVENTION

The present invention is directed to a method of treating a hydrocarbon-containing waste stream comprising greater than 0 up to 2 percent by weight hydrocarbon to form an aqueous permeate which is substantially free of hydrocarbon and a hydrocarbon-containing retentate, wherein the method comprises passing the hydrocarbon-containing waste stream through a microporous membrane to yield the aqueous permeate and the hydrocarbon-containing retentate. The membrane comprises a substantially hydrophobic, polymeric matrix and substantially hydrophilic, finely divided, particulate filler distributed throughout said matrix. The polymeric matrix has pores with a volume average diameter of less than 1.0 micron, and at least 50 percent of the pores have a mean diameter of less than 0.35 micron.

DETAILED DESCRIPTION OF THE INVENTION

Figure 1:
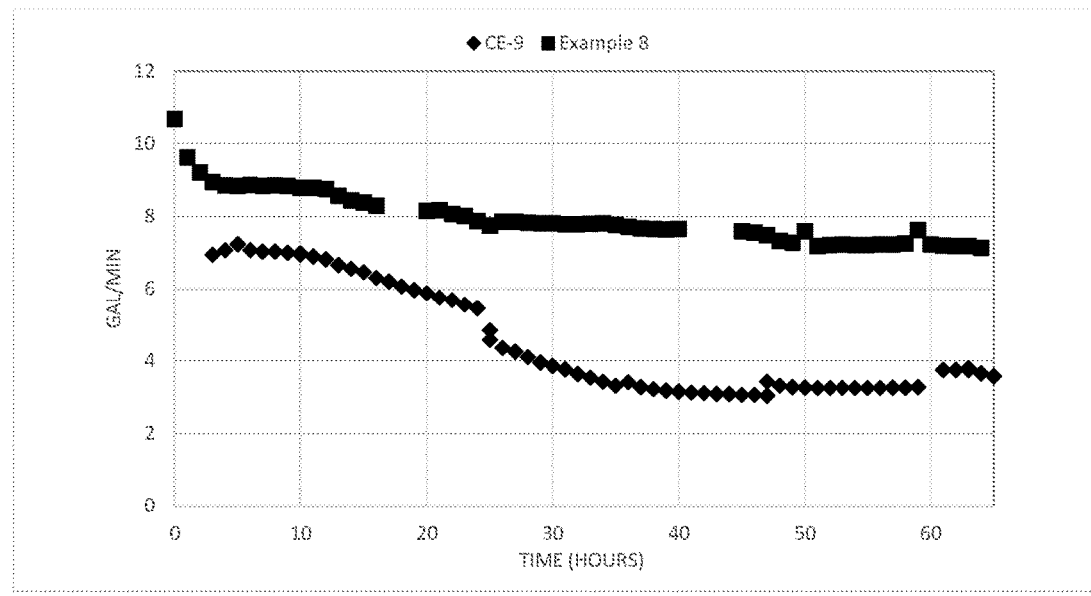
FIG. 1 is a plot of the cartridge permeate rates of the experimental cartridge (Example 8) and the comparative cartridge (CE-9) disclosed herein.

Other than in any operating examples, or where otherwise indicated, all numbers expressing quantities of ingredients, reaction conditions and so forth used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a", "an", and "the" include plural referents, unless expressly and unequivocally limited to one referent.

The various embodiments and examples of the present invention as presented herein are each understood to be non-limiting with respect to the scope of the invention.

As used in the following description and claims, the following terms have the meanings indicated below.

By "polymer" is meant a polymer including homopolymers and copolymers, and oligomers. By "composite material" is meant a combination of two or more differing materials.

As used herein, "formed from" denotes open, e.g., "comprising", claim language. As such, it is intended that a composition "formed from" a list of recited components be a composition comprising at least these recited components, and can further comprise other, non-recited components, during the composition's formation.

As used herein, the term "polymeric inorganic material" means a polymeric material having a backbone repeat unit based on an element or elements other than carbon. For more information see James Mark et al., Inorganic Polymers, Prentice Hall Polymer Science and Engineering Series, (1992) at page 5, which is specifically incorporated by reference herein. Moreover, as used herein, the term "polymeric organic materials" means synthetic polymeric materials, semisynthetic polymeric materials, and natural polymeric materials, all of which have a backbone repeat unit based on carbon.

An "organic material", as used herein, means carbon-containing compounds wherein the carbon is typically bonded to itself and to hydrogen, and often to other elements as well, and excludes binary compounds such as the carbon oxides, the carbides, carbon disulfide, etc.; such ternary compounds as the metallic cyanides, metallic carbonyls, phosgene, carbonyl sulfide, etc.; and carbon-containing ionic compounds such as metallic carbonates, for example calcium carbonate and sodium carbonate. See R. Lewis, Sr., Hawley's Condensed Chemical Dictionary, (12th Ed. 1993) at pages 761-762, and M. Silberberg, Chemistry The Molecular Nature of Matter and Change (1996) at page 586, which are specifically incorporated by reference herein.

As used herein, the term "inorganic material" means any material that is not an organic material.

As used herein, a "thermoplastic" material is a material that softens when exposed to heat and returns to its original condition when cooled to room temperature. As used herein, a "thermoset" material is a material that solidifies or "sets" irreversibly when heated or otherwise cured.

As used herein, "microporous material" or "microporous sheet material" means a material having a network of interconnecting pores, wherein, on a coating-free, printing ink-free, impregnant-free, and pre-bonding basis, the pores have a volume average diameter (i.e., mean pore size) ranging from 0.001 to 1.0 micrometer, and constitute at least 5 percent by volume of the material as discussed herein below.

By "plastomer" is meant a polymer exhibiting both plastic and elastomeric properties.

By the term "emulsion" is meant a colloidal suspension of two liquid phases in which droplets of one liquid are suspended within another liquid. In most embodiments of the present invention, one liquid is an aqueous liquid. Such emulsions may be unstable or optionally stabilized by surfactants or other emulsion stabilizers that are known in the art.

As noted above, the present invention is directed to a method of treating a hydrocarbon-containing waste stream to form a hydrocarbon-containing retentate and an aqueous permeate which is substantially free of hydrocarbon. The method comprises passing the hydrocarbon-containing waste stream through a microporous membrane to yield the hydrocarbon-containing retentate and the aqueous permeate. The membrane comprises a substantially hydrophobic, polymeric matrix and substantially hydrophilic, finely divided, particulate filler distributed throughout said matrix, wherein the polymeric matrix has pores with a volume average diameter of less than 1.0 micron, and at least 25 percent of the pores have a mean diameter of less than 0.3 micron.

As mentioned above, the membrane comprises a substantially hydrophobic, polymeric matrix (discussed herein below) and substantially hydrophilic, finely divided, particulate filler distributed throughout the matrix.

The membranes suitable for use in the method of the present invention typically include a microporous material. Suitable microporous membranes generally comprise:
(a) a polyolefin matrix material present in an amount of at least 2 percent by weight,
(b) hydrophilic, finely divided, particulate, substantially water-insoluble filler, e.g., any of those described herein below, distributed throughout the matrix, the filler constituting from about 10 percent to about 90 percent by weight of the microporous material, wherein the weight ratio of filler to polyolefin is greater than 0.3; and
(c) at least 35 percent by volume of a network of interconnecting pores communicating throughout the microporous material. The microporous material generally is prepared by the following method:
  (i) mixing the polyolefin matrix material(s) (a), filler (b), and a processing plasticizer until a substantially uniform mixture is obtained;
  (ii) introducing the mixture, optionally with additional processing plasticizer, into a heated barrel of a screw extruder and extruding the mixture through a sheeting die to form a continuous sheet;
  (iii) forwarding the continuous sheet formed by the die to a pair of heated calender rolls acting cooperatively to form continuous sheet of lesser thickness than the continuous sheet exiting from the die;
  (iv) optionally stretching the continuous sheet in at least one stretching direction above the elastic limit, wherein the stretching occurs during or immediately after step (ii) and/or step (iii) but prior to step (v);

(v) passing the sheet to a first extraction zone where the processing plasticizer is substantially removed by extraction with an organic liquid;

(vi) passing the continuous sheet to a second extraction zone where residual organic extraction liquid is substantially removed by steam and/or water;

(vii) passing the continuous sheet through a dryer for substantial removal of residual water and remaining residual organic extraction liquid; and (viii) optionally stretching the continuous sheet in at least one stretching direction above the elastic limit, wherein the stretching occurs during or after step (v), step (vi), and/or step (vii) to form a microporous material.

It should be noted that while the polymeric matrix material may be heated and melted in an extruder as noted above in the preparation of the membrane sheet, it is unsintered; i.e., by 'sintering' is meant a step which causes the individual particles of material, for example polymer or resin, to adhere together in a solid porous matrix without the need for a separately introduced binder, while retaining their individual identity as discreet particles to a substantial extent on heating. Sintering may be conducted on polymeric particles by heating in an oven at a temperature such as 150° C. for a time to allow for adhesion of particles to each other, such as at least 1 hour. In contrast, the polymeric matrix material(s) used in the membranes in the process of the present invention undergoes a melt such that retention of individual polymeric particle identity does not occur in the preparation of the membranes used in the present invention.

Microporous materials used in the membranes may comprise a polyolefin matrix. The polyolefin matrix is present in the microporous material in an amount of at least 2 percent by weight. Polyolefins are polymers derived from at least one ethylenically unsaturated monomer. In certain embodiments of the present invention, the matrix comprises a plastomer. For example, the matrix may comprise a plastomer derived from butene, hexene, and/or octene. Suitable plastomers are available from ExxonMobil Chemical under the tradename "EXACT".

The matrix can comprise a different polymer derived from at least one ethylenically unsaturated monomer, which may be used in place of or in combination with the plastomer. Examples include polymers derived from ethylene, propylene, and/or butene, such as polyethylene, polypropylene, and polybutene. High density and/or ultrahigh molecular weight polyolefins, such as high density polyethylene, are also suitable.

The polyolefin matrix can comprise a copolymer of ethylene and butene.

Non-limiting examples of ultrahigh molecular weight (UHMW) polyolefin can include essentially linear UHMW polyethylene or polypropylene. Inasmuch as UHMW polyolefins are not thermoset polymers having an infinite molecular weight, they are technically classified as thermoplastic materials.

The ultrahigh molecular weight polypropylene can comprise essentially linear ultrahigh molecular weight isotactic polypropylene. Often, the degree of isotacticity of such polymer is at least 95 percent, e.g., at least 98 percent.

While there is no particular restriction on the upper limit of the intrinsic viscosity of the UHMW polyethylene, in one non-limiting example, the intrinsic viscosity can range from 18 to 39 deciliters/gram, e.g., from 18 to 32 deciliters/gram. While there is no particular restriction on the upper limit of the intrinsic viscosity of the UHMW polypropylene, in one non-limiting example, the intrinsic viscosity can range from 6 to 18 deciliters/gram, e.g., from 7 to 16 deciliters/gram.

For purposes of the present invention, intrinsic viscosity is determined by extrapolating to zero concentration the reduced viscosities or the inherent viscosities of several dilute solutions of the UHMW polyolefin where the solvent is freshly distilled decahydronaphthalene to which 0.2 percent by weight, 3,5-di-tert-butyl-4-hydroxyhydrocinnamic acid, neopentanetetrayl ester [CAS Registry No. 6683-19-8] has been added. The reduced viscosities or the inherent viscosities of the UHMW polyolefin are ascertained from relative viscosities obtained at 135° C. using an Ubbelohde No. 1 viscometer in accordance with the general procedures of ASTM D 4020-81, except that several dilute solutions of differing concentration are employed.

The nominal molecular weight of UHMW polyethylene is empirically related to the intrinsic viscosity of the polymer in accordance with the following equation:

$$M = 5.37 \times 10^4 [\acute{\eta}]^{1.37}$$

wherein M is the nominal molecular weight and $[\acute{\eta}]$ is the intrinsic viscosity of the UHMW polyethylene expressed in deciliters/gram. Similarly, the nominal molecular weight of UHMW polypropylene is empirically related to the intrinsic viscosity of the polymer according to the following equation:

$$M = 8.88 \times 104 [\acute{\eta}]^{1.25}$$

wherein M is the nominal molecular weight and $[\acute{\eta}]$ is the intrinsic viscosity of the UHMW polypropylene expressed in deciliters/gram.

A mixture of substantially linear ultrahigh molecular weight polyethylene and lower molecular weight polyethylene can be used. In certain embodiments, the UHMW polyethylene has an intrinsic viscosity of at least 10 deciliters/gram, and the lower molecular weight polyethylene has an ASTM D 1238-86 Condition E melt index of less than 50 grams/10 minutes, e.g., less than 25 grams/10 minutes, such as less than 15 grams/10 minutes, and an ASTM D 1238-86 Condition F melt index of at least 0.1 gram/10 minutes, e.g., at least 0.5 gram/10 minutes, such as at least 1.0 gram/10 minutes. The amount of UHMW polyethylene used (as weight percent) in this embodiment is described in column 1, line 52 to column 2, line 18 of U.S. Pat. No. 5,196,262, which disclosure is incorporated herein by reference. More particularly, the weight percent of UHMW polyethylene used is described in relation to FIG. 6 of U.S. Pat. No. 5,196,262; namely, with reference to the polygons ABCDEF, GHCI or JHCK of FIG. 6, which Figure is incorporated herein by reference.

The nominal molecular weight of the lower molecular weight polyethylene (LMWPE) is lower than that of the UHMW polyethylene. LMWPE is a thermoplastic material and many different types are known. One method of classification is by density, expressed in grams/cubic centimeter and rounded to the nearest thousandth, in accordance with ASTM D 1248-84 (Reapproved 1989). Non-limiting examples of the densities of LMWPE are found in the following Table A.

TABLE A

| Type | Abbreviation | Density, g/cm³ |
|---|---|---|
| Low Density Polyethylene | LDPE | 0.910-0.925 |

TABLE A-continued

| Type | Abbreviation | Density, g/cm³ |
|---|---|---|
| Medium Density Polyethylene | MDPE | 0.926-0.940 |
| High Density Polyethylene | HDPE | 0.941-0.965 |

Any or all of the polyethylenes listed in Table A above may be used as the LMWPE in the matrix of the microporous material. HDPE may be used because it can be more linear than MDPE or LDPE. Processes for making the various LMWPE's are well known and well documented. They include the high pressure process, the Phillips Petroleum Company process, the Standard Oil Company (Indiana) process, and the Ziegler process. The ASTM D 1238-86 Condition E (that is, 190° C. and 2.16 kilogram load) melt index of the LMWPE is less than about 50 grams/10 minutes. Often the Condition E melt index is less than about 25 grams/10 minutes. The Condition E melt index can be less than about 15 grams/10 minutes. The ASTM D 1238-86 Condition F (that is, 190° C. and 21.6 kilogram load) melt index of the LMWPE is at least 0.1 gram/10 minutes. In many cases, the Condition F melt index is at least 0.5 gram/10 minutes, such as at least 1.0 gram/10 minutes.

The UHMWPE and the LMWPE may together constitute at least 65 percent by weight, e.g., at least 85 percent by weight, of the polyolefin polymer of the microporous material. Also, the UHMWPE and LMWPE together may constitute substantially 100 percent by weight of the polyolefin polymer of the microporous material.

The microporous material can comprise a polyolefin comprising ultrahigh molecular weight polyethylene, ultrahigh molecular weight polypropylene, high density polyethylene, high density polypropylene, or mixtures thereof.

If desired, other thermoplastic organic polymers also may be present in the matrix of the microporous material provided that their presence does not materially affect the properties of the microporous material substrate in an adverse manner. The amount of the other thermoplastic polymer which may be present depends upon the nature of such polymer. In general, a greater amount of other thermoplastic organic polymer may be used if the molecular structure contains little branching, few long side chains, and few bulky side groups, than when there is a large amount of branching, many long side chains, or many bulky side groups. Non-limiting examples of thermoplastic organic polymers that optionally may be present in the matrix of the microporous material include low density polyethylene, high density polyethylene, poly(tetrafluoroethylene), polypropylene, copolymers of ethylene and propylene, copolymers of ethylene and acrylic acid, and copolymers of ethylene and methacrylic acid. If desired, all or a portion of the carboxyl groups of carboxyl-containing copolymers can be neutralized with sodium, zinc, or the like. Generally, the microporous material comprises at least 70 percent by weight of UHMW polyolefin, based on the weight of the matrix. In a non-limiting embodiment, the above-described other thermoplastic organic polymer are substantially absent from the matrix of the microporous material.

As previously mentioned, the membranes of the present invention further comprise substantially hydrophilic, finely divided, particulate filler distributed throughout the matrix. By "substantially hydrophilic" is meant that the fillers have polar properties and have a tendency to interact with, but are insoluble in, water and other polar substances.

Suitable fillers can include organic fillers such as hydrophilic polymers, hydrophilic microspheres, hydrophilic biopolymers, and the like. Non-limiting examples of suitable inorganic fillers can include siliceous fillers and non-siliceous fillers. Such fillers can include particles of silica, titanium oxide, iron oxide, calcium oxide, copper oxide, zinc oxide, antimony oxide, zirconium oxide, magnesium oxide, alumina, molybdenum disulfide, zinc sulfide, barium sulfate, strontium sulfate, calcium carbonate, magnesium carbonate, and magnesium hydroxide. In a particular embodiment, the finely divided, particulate filler comprises an inorganic filler material selected from the group consisting of silica, alumina, calcium oxide, zinc oxide, magnesium oxide, titanium oxide, zirconium oxide, and mixtures thereof.

In particular embodiments of the present invention, the particulate filler comprises silica particles, such as precipitated silica particles. It is important to distinguish precipitated silica from silica gel inasmuch as these different materials have different properties. Reference in this regard is made to R. K. Iler, The Chemistry of Silica, John Wiley & Sons, New York (1979). Library of Congress Catalog No. QD 181.S6144, the entire disclosure of which is incorporate herein by reference. Note especially pages 15-29, 172-176, 218-233, 364-365, 462-465, 554-564, and 578-579. Silica gel is usually produced commercially at low pH by acidifying an aqueous solution of a soluble metal silicate, typically sodium silicate, with acid. The acid employed is generally a strong mineral acid, such as sulfuric acid or hydrochloric acid, although carbon dioxide is sometimes used. Inasmuch as there is essentially no difference in density between gel phase and the surrounding liquid phase while the viscosity is low, the gel phase does not settle out, that is to say, it does not precipitate. Silica gel, then, may be described as a non-precipitated, coherent, rigid, three-dimensional network of contiguous particles of colloidal amorphous silica. The state of subdivision ranges from large, solid masses to submicroscopic particles, and the degree of hydration from almost anhydrous silica to soft gelatinous masses containing on the order of 100 parts of water per part of silica by weight.

Precipitated silica is usually produced commercially by combining an aqueous solution of a soluble metal silicate, ordinarily alkali metal silicate such as sodium silicate, and an acid so that colloidal particles will grow in weakly alkaline solution and be coagulated by the alkali metal ions of the resulting soluble alkali metal salt. Various acids may be used, including the mineral acids, but the preferred acid is carbon dioxide. In the absence of a coagulant, silica is not precipitated from solution at any pH. The coagulant used to effect precipitation may be the soluble alkali metal salt produced during formation of the colloidal silica particles, it may be an electrolyte such as a soluble inorganic or organic salt, or it may be a combination of both.

Precipitated silica, then, may be described as precipitated aggregates of ultimate particles of colloidal amorphous silica that have not at any point existed as macroscopic gel during the preparation. The sizes of the aggregates and the degree of hydration may vary widely.

Precipitated silica powders differ from silica gels that have been pulverized and ordinarily having a more open structure, that is, a higher specific pore volume. However, the specific surface area of precipitated silica as measured by the Brunauer, Emmet, Teller (BET) method using nitrogen as the adsorbate, is often lower than that of silica gel.

Many different precipitated silicas may be employed in the present invention, but the preferred precipitated silicas are those obtained by precipitation from an aqueous solution of sodium silicate using a suitable acid such as sulfuric acid, hydrochloric acid, or carbon dioxide. Such precipitated silicas are themselves known and processes for producing them are described in detail in U.S. Pat. No. 2,940,830 and in West German Offenlegungsschrift No. 35 45 615, the entire disclosures of which are incorporated herein by reference, including especially the processes for making precipitated silicas and the properties of the products.

The precipitated silicas used in the present invention can be produced by a process involving the following successive steps:

(a) an initial stock solution of aqueous alkali metal silicate having the desired alkalinity is prepared and added to (or prepared in) a reactor equipped with means for heating the contents of the reactor, (b) the initial stock solution within the reactor is heated to the desired reaction temperature, (c) acidifying agent and additional alkali metal silicate solution are simultaneously added with agitation to the reactor while maintaining the alkalinity value and temperature of the contents of the reactor at the desired values, (d) the addition of alkali metal silicate to the reactor is stopped, and additional acidifying agent is added to adjust the pH of the resulting suspension of precipitated silica to a desired acid value, (e) the precipitated silica in the reactor is separated from the reaction mixture, washed to remove by-product salts, and (f) dried to form the precipitated silica.

The washed silica solids are then dried using conventional drying techniques. Non-limiting examples of such techniques include oven drying, vacuum oven drying, rotary dryers, spray drying, or spin flash drying. Non-limiting examples of spray dryers include rotary atomizers and nozzle spray dryers. Spray drying can be carried out using any suitable type of atomizer, in particular a turbine, nozzle, liquid-pressure or twin-fluid atomizer.

The washed silica solids may not be in a condition that is suitable for spray drying. For example, the washed silica solids may be too thick to be spray dried. In one aspect of the above-described process, the washed silica solids, e.g., the washed filter cake, are mixed with water to form a liquid suspension and the pH of the suspension adjusted, if required, with dilute acid or dilute alkali, e.g., sodium hydroxide, from 6 to 7, e.g., 6.5, and then fed to the inlet nozzle of the spray dryer.

The temperature at which the silica is dried can vary widely but will be below the fusion temperature of the silica. Typically, the drying temperature will range from above 50° C. to less than 700° C., e.g., from above 100° C., e.g., 200° C. to 500° C. In one aspect of the above-described process, the silica solids are dried in a spray dryer having an inlet temperature of approximately 400° C. and an outlet temperature of approximately 105° C. The free water content of the dried silica can vary, but is usually in the range of from approximately 1 to 10 wt. %, e.g., from 4 to 7 wt. %. As used herein, the term "free water" means water that can be removed from the silica by heating it for 24 hours at from 100° C. to 200° C., e.g., 105° C.

The dried silica also can be forwarded directly to a granulator where it is compacted and granulated to obtain a granular product. Dried silica can also be subjected to conventional size reduction techniques, e.g., as exemplified by grinding and pulverizing. Fluid energy milling using air or superheated steam as the working fluid can also be used. The precipitated silica obtained is usually in the form of a powder.

Most often, the precipitated silica is rotary dried or spray dried. Rotary dried silica particles have been observed to demonstrate greater structural integrity than spray dried silica particles. They are less likely to break into smaller particles during extrusion and other subsequent processing during production of the microporous material than are spray dried particles. Particle size distribution of rotary dried particles does not change as significantly as does that of spray dried particles during processing. Spray dried silica particles are more friable than rotary dried, often providing smaller particles during processing. It is possible to use a spray dried silica of a particular particle size such that the final particle size distribution in the membrane does not have a detrimental effect on water flux. In certain embodiments, the silica is reinforced; i.e., has a structural integrity such that porosity is preserved after extrusion. More preferred is a precipitated silica in which the initial number of silica particles and the initial silica particle size distribution is mostly unchanged by stresses applied during membrane fabrication, such that a broad particle size distribution is present in the finished membrane. Blends of different types of dried silica and different sizes of silica may be used to provide unique properties to the membrane. For example, a blend of silicas with a bimodal distribution of particle sizes may be particularly suitable for certain separation processes. It is expected that external forces applied to silica of any type may be used to influence and tailor the particle size distribution, providing unique properties to the final membrane.

The surface of the filler particles can be modified in any manner well known in the art, including, but not limited to, chemically or physically changing its surface characteristics using techniques known in the art. For example, the filler may be surface treated with an anti-fouling moiety such as polyethylene glycol, carboxybetaine, sulfobetaine and polymers thereof, mixed valence molecules, oligomers and polymers thereof, and mixtures thereof. Another embodiment may be a blend of fillers in which one has been treated with a positively charged moiety and the other has been treated with a negatively charged moiety. The filler also may be surface modified with functional groups such as cations or anions that allow for targeted removal of specific contaminants in a fluid stream to be purified using the microporous membrane. Untreated filler particles may also be used. Filler particles coated with hydrophilic coatings can reduce fouling and may eliminate pre-wetting processing. Filler particles coated with hydrophobic coatings also can reduce fouling and may aid degassing and venting of a system.

Suitable filler particles, e.g., precipitated silica particles, typically have an average ultimate particle size of 1 to 100 nanometers.

The surface area of the filler particles, in particular, silica particles, is considered both external and internal surface area due to the presence of the pores. Such surface area can have a significant impact on performance. High surface area fillers are materials of very small particle size, materials having a high degree of porosity or materials exhibiting both characteristics. Usually, the surface area of the filler itself is in the range of from about 125 to about 700 square meters per gram ($m^2/g$) as determined by the Brunauer, Emmett, Teller (BET) method according to ASTM C 819-77 using nitrogen as the adsorbate but modified by outgassing the system and the sample for one hour at 130° C. Often, the BET surface area is in the range of from about 190 to 350 m²/g, more often, suitable filler particulates, in particular the silica particulates, demonstrate a BET surface area of 351 to 700 m²/g.

The BET/CTAB quotient is the ratio of the overall filler particle (e.g., precipitated silica) surface area including the surface area contained in pores only accessible to smaller molecules, such as nitrogen (BET), to the external surface area (CTAB). This ratio is typically referred to as a measure of microporosity. A high microporosity value, i.e., a high BET/CTAB quotient number, is a high proportion of internal surface—accessible to the small nitrogen molecule (BET surface area) but not to larger particles—to the external surface (CTAB).

It has been suggested that the structure, i.e., pores, formed within the filler, e.g., precipitated silica, during its preparation can have an impact on performance. Two measurements of this structure are the BET/CTAB surface area ratio of the precipitated silica noted above, and the relative breadth ($\gamma$) of the pore size distribution of the precipitated silica. The relative breadth ($\gamma$) of pore size distribution is an indication of how broadly the pore sizes are distributed within the precipitated silica particle. The lower the $\gamma$ value, the narrower is the pore size distribution of the pores within the precipitated silica particle.

The silica CTAB values may be determined using a CTAB solution and the hereinafter described method. The analysis is performed using a Metrohm 751 Titrino automatic titrator, equipped with a Metrohm Interchangeable "Snap-In" 50 milliliter buret and a Brinkmann Probe Colorimeter Model PC 910 equipped with a 550 nm filter. In addition, a Mettler Toledo HB43 or equivalent is used to determine the 105° C. moisture loss of the silica and a Fisher Scientific Centrific™ Centrifuge Model 225 may be used for separating the silica and the residual CTAB solution. The excess CTAB can be determined by auto titration with a solution of Aerosol OT® until maximum turbidity is attained, which can be detected with the probe colorimeter. The maximum turbidity point is taken as corresponding to a millivolt reading of 150. Knowing the quantity of CTAB adsorbed for a given weight of silica and the space occupied by the CTAB molecule, the external specific surface area of the silica is calculated and reported as square meters per gram on a dry-weight basis.

Solutions required for testing and preparation include a buffer of pH 9.6, cetyl [hexadecyl] trimethyl ammonium bromide (CTAB), dioctyl sodium sulfosuccinate (Aerosol OT) and 1N sodium hydroxide. The buffer solution of pH 9.6 can be prepared by dissolving 3.101 g of orthoboric acid (99%; Fisher Scientific, Inc., technical grade, crystalline) in a one-liter volumetric flask, containing 500 milliliters of deionized water and 3.708 grams of potassium chloride solids (Fisher Scientific, Inc., technical grade, crystalline). Using a buret, 36.85 milliliters of the 1N sodium hydroxide solution was added. The solution is mixed and diluted to volume.

The CTAB solution is prepared using 11.0 g±0.005 g of powdered CTAB (cetyl trimethyl ammonium bromide, also known as hexadecyl trimethyl ammonium bromide, Fisher Scientific Inc., technical grade) onto a weighing dish. The CTAB powder is transferred to a 2-liter beaker and the weighing dish rinsed with deionized water. Approximately 700 milliliters of the pH 9.6 buffer solution and 1000 milliliters of distilled or deionized water is added to the 2-liter beaker and stirred with a magnetic stir bar. The beaker may be covered and stirred at room temperature until the CTAB powder is totally dissolved. The solution is transferred to a 2-liter volumetric flask, rinsing the beaker and stir bar with deionized water. The bubbles are allowed to dissipate and the solution diluted to volume with deionized water. A large stir bar can be added and the solution mixed on a magnetic stirrer for approximately 10 hours. The CTAB solution can be used after 24 hours and for only 15 days. The Aerosol OT® (dioctyl sodium sulfosuccinate, Fisher Scientific Inc., 100% solid) solution may be prepared using 3.46 g±0.005 g, which is placed onto a weighing dish. The Aerosol OT® on the weighing dish is rinsed into a 2-liter beaker, which contains about 1500 milliliters of deionized water and a large stir bar. The Aerosol OT® solution is dissolved and rinsed into a 2-liter volumetric flask. The solution is diluted to the 2-liter volume mark in the volumetric flask. The Aerosol OT® solution is allowed to age for a minimum of 12 days prior to use. The shelf life of the Aerosol OT® solution is 2 months from the preparation date.

Prior to surface area sample preparation, the pH of the CTAB solution should be verified and adjusted as necessary to a pH of 9.6±0.1 using 1N sodium hydroxide solution. For test calculations, a blank sample should be prepared and analyzed. 5 milliliters of the CTAB solution are pipetted and 55 milliliters of deionized water added into a 150-milliliter beaker and analyzed on a Metrohm 751 Titrino automatic titrator. The automatic titrator is programmed for determination of the blank and the samples with the following parameters: Measuring point density=2, Signal drift=20, Equilibrium time=20 seconds, Start volume=0 ml, Stop volume=35 ml, and Fixed endpoint=150 mV. The buret tip and the colorimeter probe are placed just below the surface of the solution, positioned such that the tip and the photo probe path length are completely submerged. Both the tip and photo probe should be essentially equidistant from the bottom of the beaker and not touching one another. With minimum stirring (setting of 1 on the Metrohm 728 stirrer) the colorimeter is set to 100% T prior to every blank and sample determination and titration initiated with the Aerosol OT® solution. The end point can be recorded as the volume (ml) of titrant at 150 mV.

For test sample preparation, approximately 0.30 grams of powdered silica was weighed into a 50-milliliter container containing a stir bar. Granulated silica samples were riffled (prior to grinding and weighing) to obtain a representative sub-sample. A coffee mill style grinder was used to grind granulated materials. Then 30 milliliters of the pH adjusted CTAB solution was pipetted into the sample container containing the 0.30 grams of powdered silica. The silica and CTAB solution was then mixed on a stirrer for 35 minutes. When mixing was completed, the silica and CTAB solution were centrifuged for 20 minutes to separate the silica and excess CTAB solution. When centrifuging was completed, the CTAB solution was pipetted into a clean container minus the separated solids, referred to as the "centrifugate". For sample analysis, 50 milliliters of deionized water was placed into a 150-milliliter beaker containing a stir bar. Then 10 milliliters of the sample centrifugate was pipetted for analysis into the same beaker. The sample was analyzed using the same technique and programmed procedure as used for the blank solution.

For determination of the moisture content, approximately 0.2 grams of silica was weighed onto the Mettler Toledo HB43 while determining the CTAB value. The moisture analyzer was programmed to 105° C. with the shut-off 5 drying criteria. The moisture loss was recorded to the nearest+0.1%.

The external surface area is calculated using the following equation, $$CTAB \text{ Surface Area (dried basis)}[m^2/g] = \frac{(2V_o - V) \times (4774)}{(V_o W) \times (100 - Vol)}$$

wherein, $V_o$=Volume in ml of Aerosol OT® used in the blank titration.

V=Volume in ml of Aerosol OT® used in the sample titration.

W=sample weight in grams.

Vol=% moisture loss (Vol represents "volatiles").

Typically, the CTAB surface area of the silica particles used in the present invention ranges from 120 to 500 m²/g. Often, the silica demonstrates a CTAB surface area of 170-280 m²/g. More often, the silica demonstrates a CTAB surface area of 281-500 m²/g.

In certain embodiments of the present invention, the BET value of the precipitated silica will be a value such that the quotient of the BET surface area in square meters per gram to the CTAB surface area in square meters per gram is equal to or greater than 1.0. Often, the BET to CTAB ratio is 1.0-1.5. More often, the BET to CTAB ratio is 1.5-2.0.

The BET surface area values reported in the examples of this application were determined in accordance with the Brunauer-Emmet-Teller (BET) method in accordance with ASTM D 1993-03. The BET surface area can be determined by fitting five relative-pressure points from a nitrogen sorption isotherm measurement made with a Micromeritics TriStar 3000™ instrument. A flow Prep-060™ station provides heat and a continuous gas flow to prepare samples for analysis. Prior to nitrogen sorption, the silica samples are dried by heating to a temperature of 160° C. in flowing nitrogen (P5 grade) for at least one (1) hour.

The filler particles can constitute from 10 to 90 percent by weight of the microporous material. For example, such filler particles can constitute from 25 to 90 percent by weight of the microporous material, such as from 30 percent to 90 percent by weight of the microporous material, or from 40 to 90 percent by weight of the microporous material, or from 50 to 90 percent by weight of the microporous material, and even from 60 percent to 90 percent by weight of the microporous material. The filler is typically present in the microporous material of the present invention in an amount of 25 percent to about 85 percent by weight of the microporous material. Often, the weight ratio of filler to polyolefin in the microporous material is greater than 0.3, frequently 1.4 to 3.5:1. Alternatively, the weight ratio of filler to polyolefin in the microporous material may be greater than 4:1, for example as high as 10:1.

The microporous material used in the membrane employed in the process of the present invention further comprises a network of interconnecting pores communicating throughout the microporous material. The pores have a volume average diameter less than 1.0 micron, such as a volume average diameter ranging from 0.01 to 0.9 micron, or from 0.02 to 0.7 micron, or from 0.02 to 0.5 micron, or from 0.03 to 0.5 micron. Moreover, at least 50 percent, such as at least 55 percent, or at least 60 percent, or at least 70 percent of the pores have a mean diameter of less than 0.35 micron.

On an impregnant-free basis, such pores can comprise at least 15 percent by volume, e.g., from at least 20 to 95 percent by volume, or at least 25 to 95 percent by volume, or from 35 to 70 percent by volume of the microporous material. Often, the pores comprise at least 35 percent by volume, or even at least 45 percent by volume of the microporous material. Such high porosity provides higher surface area throughout the microporous material, which in turn facilitates removal of contaminants from a fluid stream and higher flux rates of a fluid stream through the membrane.

As used herein and in the claims, the porosity (also known as void volume) of the microporous material, expressed as percent by volume, is determined according to the following equation:

$$\text{Porosity}=100[1-d_1/d_2]$$

wherein $d_1$ is the density of the sample, which is determined from the sample weight and the sample volume as ascertained from measurements of the sample dimensions, and $d_2$ is the density of the solid portion of the sample, which is determined from the sample weight and the volume of the solid portion of the sample. The volume of the solid portion of the same is determined using a Quantachrome Stereopycnometer™ (Quantachrome Corp.) in accordance with the accompanying operating manual.

The volume average diameter, or mean pore size, of the pores of the microporous material can be determined by mercury porosimetry using an Auto Pore III porosimeter (Micromeritics, Inc.) in accordance with the accompanying operating manual.

The volume average pore radius for a single scan is automatically determined by the porosimeter. In operating the porosimeter, a scan is made in the high pressure range (from 138 kilopascals absolute to 227 megapascals absolute). If approximately 2 percent or less of the total intruded volume occurs at the low end (from 138 to 250 kilopascals absolute) of the high pressure range, the volume average pore diameter is taken as twice the volume average pore radius determined by the porosimeter. Otherwise, an additional scan is made in the low pressure range (from 7 to 165 kilopascals absolute) and the volume average pore diameter is calculated according to the equation:

$$d=2[v_1 r_1/w_1 + v_2 r_2/w_2]/[v_1/w_1 + v_2/w_2]$$

wherein d is the volume average pore diameter, $v_1$ is the total volume of mercury intruded in the high pressure range, $v_2$ is the total volume of mercury intruded in the low pressure range, $r_1$ is the volume average pore radius determined from the high pressure scan, $r_2$ is the volume average pore radius determined from the low pressure scan, $w_1$ is the weight of the sample subjected to the high pressure scan, and $w_2$ is the weight of the sample subjected to the low pressure scan. The volume average diameter of the pores is typically less than 1.0 micrometer (micron), and can be, for example, in the range of from 0.001 to 0.7 micron, such as 0.02 to 0.7 micron, or from 0.02 to 0.5 micron, or from 0.3 to 0.7 micron. Also, as previously mentioned, at least 50 percent of the pores can have a mean diameter of at least 0.35 micron. In the course of determining the volume average pore diameter using the above procedure, the maximum pore radius detected is sometimes noted. This is taken from the low pressure range scan, if run; otherwise it is taken from the high pressure range scan. The maximum pore diameter is twice the maximum pore radius. Inasmuch as some production or treatment steps, e.g., coating processes, printing processes, impregnation processes and/or bonding processes, can result in the filling of at least some of the pores of the microporous material, and since some of these processes irreversibly compress the microporous material, the parameters in respect of porosity, volume average diameter of the pores, and maximum pore diameter are determined for the microporous material prior to the application of one or more of such production or treatment steps.

Porosity also can be measured using a Gurley Densometer, model 4340, manufactured by GPI Gurley Precision Instruments of Troy, N.Y. The porosity values reported are a measure of the rate of air flow through a sample or it's resistance to an air flow through the sample. The unit of measure for this method is a "Gurley second" and represents the time in seconds to pass 100 cc of air through a 1 inch square area using a pressure differential of 4.88 inches of water. Lower values equate to less air flow resistance (more air is allowed to pass freely). For purposes of the present invention, the measurements are completed using the procedure listed in the manual for MODEL 4340 Automatic Densometer.

In certain embodiments of the present invention, to prepare the microporous materials, filler, polymer powder (polyolefin polymer), processing plasticizer, and minor amounts of lubricant and antioxidant are mixed until a substantially uniform mixture is obtained. The weight ratio of filler to polymer powder employed in forming the mixture is essentially the same as that of the microporous material substrate to be produced. The mixture, together with additional processing plasticizer, is introduced to the heated barrel of a screw extruder. Attached to the extruder is a die, such as a sheeting die, to form the desired end shape.

In an exemplary manufacturing process, the material is formed into a sheet or film, and a continuous sheet or film formed by a die is forwarded to a pair of heated calender rolls acting cooperatively to form a continuous sheet of lesser thickness than the continuous sheet exiting from the die. The final thickness may depend on the desired end-use application. The microporous material may have a thickness ranging from 0.7 to 18 mil (17.8 to 457.2 microns) and demonstrates a bubble point of 1 to 80 psi based on ethanol.

In certain embodiments, the sheet exiting the calender rolls is then stretched in at least one stretching direction above the elastic limit. Stretching may alternatively take place during or after exiting from the sheeting die or during calendering, or multiple times, but it is typically done after extraction. Stretched microporous material substrate may be produced by stretching the intermediate or final product in at least one stretching direction above the elastic limit. Usually, the stretch ratio is at least about 1.1. In many cases, the stretch ratio is at least about 1.3, such as at least about 1.5. Frequently, the stretch ratio is in the range of from about 1.5 to about 15. Often, the stretch ratio is in the range of from about 1.7 to about 10. Preferably, the stretch ratio is in the range of from about 2 to about 6.

The temperatures at which stretching is accomplished may vary widely. Stretching may be accomplished at about ambient room temperature, but usually elevated temperatures are employed. The intermediate product may be heated by any of a wide variety of techniques prior to, during, and/or after stretching. Examples of these techniques include radiative heating such as that provided by electrically heated or gas fired infrared heaters, convective heating such as that provided by recirculating hot air, and conductive heating such as that provided by contact with heated rolls. The temperatures which are measured for temperature control purposes may vary according to the apparatus used and personal preference. For example, temperature-measuring devices may be placed to ascertain the temperatures of the surfaces of infrared heaters, the interiors of infrared heaters, the air temperatures of points between the infrared heaters and the intermediate product, the temperatures of circulating hot air at points within the apparatus, the temperature of hot air entering or leaving the apparatus, the temperatures of the surfaces of rolls used in the stretching process, the temperature of heat transfer fluid entering or leaving such rolls, or film surface temperatures. In general, the temperature or temperatures are controlled such that the intermediate product is stretched about evenly so that the variations, if any, in film thickness of the stretched microporous material are within acceptable limits and so that the amount of stretched microporous material outside of those limits is acceptably low. It will be apparent that the temperatures used for control purposes may or may not be close to those of the intermediate product itself since they depend upon the nature of the apparatus used, the locations of the temperature-measuring devices, and the identities of the substances or objects whose temperatures are being measured.

In view of the locations of the heating devices and the line speeds usually employed during stretching, gradients of varying temperatures may or may not be present through the thickness of the intermediate product. Also, because of such line speeds, it is impracticable to measure these temperature gradients. The presence of gradients of varying temperatures, when they occur, makes it unreasonable to refer to a singular film temperature. Accordingly, film surface temperatures, which can be measured, are best used for characterizing the thermal condition of the intermediate product.

These are ordinarily about the same across the width of the intermediate product during stretching although they may be intentionally varied, as for example, to compensate for intermediate product having a wedge-shaped cross section across the sheet. Film surface temperatures along the length of the sheet may be about the same or they may be different during stretching.

The film surface temperatures at which stretching is accomplished may vary widely, but in general they are such that the intermediate product is stretched about evenly, as explained above. In most cases, the film surface temperatures during stretching are in the range of from about 20° C. to about 220° C. Often, such temperatures are in the range of from about 50° C. to about 200° C. From about 75° C. to about 180° C. is preferred.

Stretching may be accomplished in a single step or a plurality of steps as desired. For example, when the intermediate product is to be stretched in a single direction (uniaxial stretching), the stretching may be accomplished by a single stretching step or a sequence of stretching steps until the desired final stretch ratio is attained. Similarly, when the intermediate product is to be stretched in two directions (biaxial stretching), the stretching can be conducted by a single biaxial stretching step or a sequence of biaxial stretching steps until the desired final stretch ratios are attained. Biaxial stretching may also be accomplished by a sequence of one of more uniaxial stretching steps in one direction and one or more uniaxial stretching steps in another direction. Biaxial stretching steps where the intermediate product is stretched simultaneously in two directions and uniaxial stretching steps may be conducted in sequence in any order. Stretching in more than two directions is within contemplation. It may be seen that the various permutations of steps are quite numerous. Other steps, such as cooling, heating, sintering, annealing, reeling, unreeling, and the like, may optionally be included in the overall process as desired.

Various types of stretching apparatus are well known and may be used to accomplish stretching of the intermediate product. Uniaxial stretching is usually accomplished by stretching between two rollers, wherein the second or down-stream roller rotates at a greater peripheral speed than the first or upstream roller. Uniaxial stretching can also be accomplished on a standard tentering machine. Biaxial stretching may be accomplished by simultaneously stretching in two different directions on a tentering machine. More commonly, however, biaxial stretching is accomplished by first uniaxially stretching between two differentially rotating rollers as described above, followed by either uniaxially stretching in a different direction using a tentering machine or by biaxially stretching using a tentering machine. The most common type of biaxial stretching is where the two stretching directions are approximately at right angles to each other. In most cases where continuous sheet is being stretched, one stretching direction is at least approximately parallel to the long axis of the sheet (machine direction) and the other stretching direction is at least approximately perpendicular to the machine direction and is in the plane of the sheet (transverse direction).

Stretching the sheets prior to or after extraction of the processing plasticizer allows for larger pore sizes than in microporous materials conventionally processed, thus making the microporous material particularly suitable for use in the microfiltration membranes of the present invention. It is also believed that stretching of the sheets prior to extraction of the processing plasticizer minimizes thermal shrinkage after processing.

The product passes to a first extraction zone where the processing plasticizer is substantially removed by extraction with an organic liquid which is a good solvent for the processing plasticizer, a poor solvent for the organic polymer, and more volatile than the processing plasticizer. Usually, but not necessarily, both the processing plasticizer and the organic extraction liquid are substantially immiscible with water. The product then passes to a second extraction zone where the residual organic extraction liquid is substantially removed by steam and/or water. The product is then passed through a forced air dryer for substantial removal of residual water and remaining residual organic extraction liquid. From the dryer, the microporous material may be passed to a take-up roll, when it is in the form of a sheet.

The processing plasticizer has little solvating effect on the thermoplastic organic polymer at 60° C., only a moderate solvating effect at elevated temperatures on the order of about 100° C., and a significant solvating effect at elevated temperatures on the order of about 200° C. It is a liquid at room temperature and usually it is processing oil such as paraffinic oil, naphthenic oil, or aromatic oil. Suitable processing oils include those meeting the requirements of ASTM D 2226-82, Types 103 and 104. Those oils which have a pour point of less than 22° C., or less than 10° C., according to ASTM D 97-66 (reapproved 1978) are used most often. Examples of suitable oils include Shellflex® 412 and Shellflex® 371 oil (Shell Oil Co.) which are solvent refined and hydrotreated oils derived from naphthenic crude. It is expected that other materials, including the phthalate ester plasticizers such as dibutyl phthalate, bis(2-ethylhexyl) phthalate, diisodecyl phthalate, dicyclohexyl phthalate, butyl benzyl phthalate, and ditridecyl phthalate will function satisfactorily as processing plasticizers.

There are many organic extraction liquids that can be used. Examples of suitable organic extraction liquids include 1,1,2-trichloroethylene, perchloroethylene, 1,2-dichloroethane, 1,1,1-trichloroethane, 1,1,2-trichloroethane, methylene chloride, chloroform, isopropyl alcohol, diethyl ether, and acetone.

In the above-described process for producing microporous material substrate, extrusion and calendering are facilitated when the filler carries much of the processing plasticizer. The capacity of the filler particles to absorb and hold the processing plasticizer is a function of the surface area of the filler. Therefore, the filler typically has a high surface area as discussed above. Inasmuch as it is desirable to essentially retain the filler in the microporous material substrate, the filler should be substantially insoluble in the processing plasticizer and substantially insoluble in the organic extraction liquid when microporous material substrate is produced by the above process.

The residual processing plasticizer content is usually less than 15 percent by weight of the resulting microporous material and this may be reduced even further to levels, such as less than 5 percent by weight, by additional extractions using the same or a different organic extraction liquid.

The resulting microporous materials may be further processed depending on the desired application. For example, a hydrophilic or hydrophobic coating may be applied to the surface of the microporous material to adjust the surface energy of the material. Also, the microporous material may be adhered to a support layer such as a fiberglass layer to provide additional structural integrity, depending on the particular end use. Additional optional stretching of the continuous sheet in at least one stretching direction may also be done during or immediately after any of the steps upon extrusion in step (ii). In the production of a microfiltration membrane, typically the stretching step occurs after extraction of the plasticizer.

The microporous materials prepared as described above are suitable for use as the membranes in the processes of the present invention, and are capable of removing particulates from a fluid stream ranging in size from 0.05 to 1.5 microns. The membranes also serve to remove molecular contaminants from a fluid stream by adsorption and/or by physical rejection due to molecular size, allowing for separation of a hydrocarbon-containing waste stream into a hydrocarbon-containing retentate and an aqueous permeate.

The membranes may be in the form of a sheet or housed (i.e., as a component) in a filter assembly. Any suitable filter assembly known in the art may be used, with the membrane described above used as the separation medium. The membrane housed within the filter assembly may be in any practical configuration; it is typically configured to maximize surface area contact with the fluid being treated, such as by pleating. Non-limiting examples of suitable filter assemblies include spiral crossflow filters as described in U.S. Pat. No. 8,454,829; FIGS. 1-8 and column 4, line 46 to column 8, line 47 of the reference are incorporated herein by reference. The method of the present invention comprises contacting a hydrocarbon-containing waste stream with the membrane, typically by passing the stream through the membrane, to form a hydrocarbon-containing retentate. The retentate has a higher concentration of hydrocarbon than that of the hydrocarbon-containing waste stream being treated. Also formed is an aqueous permeate which is substantially free from hydrocarbon. As used herein with respect to the aqueous permeate produced by the method of the present invention, by "substantially free of hydrocarbon" is meant that the aqueous permeate contains less than 50 parts per million (ppm) hydrocarbon, e.g., less than 45 ppm, or less than 40 ppm, or less than 30 ppm, or less than 25 ppm, or less than 20 ppm hydrocarbon. The aqueous permeate produced by the method of the present invention is sufficiently purified of free, dissolved or emulsified hydrocarbon.

The hydrocarbon-containing waste stream may be passed through several such membranes in series; however, a single pass is sufficient to yield the purities noted above, thus rendering the process of the present invention superior to conventional separation processes that use conventional filters and membranes.

Hydrocarbon-containing waste streams to be treated by the process of the present invention contain both hydrocarbon and aqueous phases. Examples include crude oil well effluents (both inland and offshore oil production effluents) such as fracking effluents and conventional oil drilling effluents. Other crude oil well effluents such as wastewater streams from oil production including oil and gas drilling muds, drilling additives, polyacrylamide polymers, and other hydrocarbon based well additives and oil production brines are also suitable fluid emulsions. The method of the invention can be used to treat hydrocarbon-containing waste streams comprising any percent by weight hydrocarbon and/or water. For example, the process of the invention can be used to treat waste streams comprising hydrocarbon and water, with the hydrocarbon comprising at least 0.1 percent by weight of the waste stream, for example, at least 0.2 percent by weight, or at least 0.5 percent by weight, for example, at least 1 percent by weight, for example, at least 2 percent by weight, for example, at least 5 percent by weight. For example, the process of the invention can be used to treat hydrocarbon-containing waste streams comprising greater than 0 up to 2 percent by weight hydrocarbon and at least 98 percent by weight water. For example, the method of the present invention can be used in the treatment of a hydrocarbon-containing waste stream comprising 0.1 to 2.0 percent hydrocarbon, such as 0.1 to 1.5 percent hydrocarbon, or 0.1 to 1.0 percent hydrocarbon, or 0.2 to 0.75 percent hydrocarbon.

For the purposes of the present invention, flux rates may be expressed in gallons/(ft$^2$×psixday) (GFD/psi). The fluid, hydrocarbon-containing waste stream to be treated usually is passed through the membrane at a flux rate of 0.05 to 20 GFD/psi. Again, the waste stream to be treated may be passed through several membranes in series, but because of the high efficacy of the membranes used in the method of the present invention, a single pass typically is sufficient to achieve aqueous permeate purities that are compliant with industry standards, described quantitatively above. Moreover, in certain embodiments, the hydrocarbon-containing waste stream does not undergo any separation processes such as settling in one or more serial tanks, distillation, or centrifugation prior to passing through the membrane. Preliminary separation processes are not necessary.

In the method of the present invention, the hydrocarbon-containing waste stream to be treated is contacted with the membrane described above. The aqueous phase of the waste stream passes through the membrane forming an aqueous permeate. The hydrocarbon phase does not pass through the membrane and forms a hydrocarbon-containing retentate. The hydrocarbon-containing retentate may be recirculated through the membrane at least once, either by itself for further purification or upon admixture with additional untreated hydrocarbon-containing waste stream feed.

A plurality of membranes configured in parallel filter assemblies may be used in the method of the present invention to achieve a desired flow rate, such as a flow rate of at least 125 gal/min. It has been observed that minimal fouling of the membrane occurs during operation when used to treat oil well effluents, in contrast to conventional separation technologies used for oil well effluents. The membranes used in the process of the present invention are significantly more resistant to fouling than conventional separation systems. Therefore, in certain embodiments of the present invention, the flow rate of the hydrocarbon-containing waste stream during the process is at least 125 gal/min over at least 168 hours of service time of the microfiltration membrane.

It is particularly noteworthy that the membrane can demonstrate a hydrocarbon retention rate, and the retentate and aqueous permeate produced by the method of the present invention have a purity that generally are independent of (i) flux rate of the aqueous phase passing through the membrane and (ii) the pore size of the membrane. While not intending to be bound by theory, it is believed that surface interactions between the various phases of the fluid waste stream and the respective hydrophilic and hydrophobic components of the membrane contribute to the hydrocarbon retention rate of the membrane and the purities of the aqueous permeate produced by the method of the present invention. The present invention is more particularly described in the following examples which are intended to be illustrative only, since numerous modifications and variations therein will be apparent to those skilled in the art.

EXAMPLES

Part I: Preparation of Stretched Sheet Microporous Materials

The microporous membranes used in the following examples were prepared in two steps. First, microporous membranes were prepared according to procedures previously described. Microporous Membrane A was prepared according to Example 2 of US 2014/0069862. Microporous Membrane B was prepared according to Example 3 of US 2014/0069862. Microporous Membrane C was prepared according to the procedure of Example 3 of US 2014/0069862, using 1000 parts silica and 1330 parts TUFFLO® 6056 (commercially available from PPC Lubricants).

The membranes described above were then stretched to produce membranes with the desired properties and pore sizes. Stretching was conducted by Parkinson Technologies, Inc. using the Marshall and Williams Biaxial Orientation Plastic Processing System. The Machine Direction Oriented (MDO) stretching of the materials, where indicated, was accomplished by heating the specified membrane material and stretching it in the machine direction over a series of rollers maintained at the temperatures listed in Table 1.

After MDO stretching and where indicated, Transverse Direction Orientation (TDO) stretching was conducted by heating the resultant sheets according to the temperature conditions listed in Table 1, and stretching in the transverse (or cross) direction on a tenter frame, consisting of two horizontal chain tracks, on which clip and chain assemblies held the material in place.

TABLE 1

Stretched Microporous Membrane Preparation

| Examples | | 1 | 2 | 3 | 4 | CE-5 |
|---|---|---|---|---|---|---|
| Microporous Sheet Material | | A | B | B | C | B |
| MDO | Stretch roll (° C.) | — | 132 | 132 | 132 | 132 |
| | Anneal roll (° C.) | — | 141 | 141 | 141 | 141 |
| | Cooling (° C.) | — | 25 | 25 | 25 | 25 |
| | Slow draw speed (FPM) | — | 10.4 | 10.4 | 10.4 | 10.4 |
| | Fast Roll Speed (FPM) | — | 35 | 35 | 30 | 30 |

TABLE 1-continued

Stretched Microporous Membrane Preparation

| | Examples | 1 | 2 | 3 | 4 | CE-5 |
|---|---|---|---|---|---|---|
| TDO | Stretch ratio | 1 | — | 2 | 4 | 4 |
| | Preheat (° C.) | 132 | — | 132 | 141 | 132 |
| | Stretching (° C.) | 132 | — | 132 | 141 | 132 |
| | Anneal (° C.) | 132 | — | 132 | 141 | 132 |
| | Line speed (FPM) | 30 | — | 35 | 30 | 35 |

Comparative Membrane Examples

CE-5 was a stretched membrane prepared in Table 1 above.

CE-6 was GE-Osmonics ULTRAFILIC® membrane, a treated polyacrylonitrile membrane sold commercially by Sterlitech Corporation for oil/water separation.

CE-7 was HFM® 180, a polyvinylidene difluoride ultrafiltration membrane, commercially available from Sterlitech Corporation.

Part II: Membrane Materials and Physical Properties

The physical properties of the membrane materials referenced in the examples and comparative examples are summarized in Table 2.

TABLE 2

Physical Properties of Membrane Materials

| Examples | Thickness[1] (μm) | Gurley Porosity[2] (sec) | Bubble Point[3] (bar) | MW Cut-off | Mean Pore Size[3] (μm) | Cumulative pore number <0.35 micron (%) |
|---|---|---|---|---|---|---|
| 1 | 135 | 40 | 3.6 | N/A | 0.15 | 100 |
| 2 | 200 | 150 | 4.5 | N/A | 0.10 | 100 |
| 3 | 80 | 180 | 4.8 | N/A | 0.08 | 100 |
| 4 | 70 | 25 | 1.7 | N/A | 0.36 | 67 |
| CE-5 | 76 | 20 | 1.6 | N/A | 0.39 | 0 |
| CE-6 | 198 | 854 | N/A | 20-50K | 0.01[4] | unknown |
| CE-7 | 210 | 416 | N/A | 100K | n/a | unknown |

[1]Thickness was determined by using an Ono Sokki thickness gauge EG-225. The thickness reported is an average of 9 measurements.
[2]Porosity was measured with a Gurley Densometer, model 4340, manufactured by GPI Gurley Precision Instruments of Troy, New York according to the operating instructions.
[3]ASTM F316-03 was followed, using a Porometer 3G manufactured by Quantachrome Instruments. POROFEL ® Wetting Fluid, available from Quantachrome Instruments, was used to wet the membrane before testing.
[4]As reported in product literature Part III: Oil/Water Cross-Flow Separation Test Water flux testing was carried out using a cross-flow test cell apparatus, Model CF-042 available from Sterlitech Corporation, WA, as described in the examples below. Testing was performed on crude oil/water preparations with 0.125%, 0.25%, 0.5%, and 0.75% by weight of crude oil content. The crude oil in water cross-flow test results for each oil concentration are presented in Tables 4, 5, 6, 7, and 8 respectively.

Part IIIA: Model Aqueous Crude Oil Preparations

For each oil concentration, 8 gallons of deionized water was charged into a feed tank and stirred with a 5-inch blade driven by a compression air pressure of 30 psi. Designated amounts of the salts listed in Table 3 below were slowly added to the feed tank. The water and the salts were mixed by stirring constantly for 30 min. until a homogenous solution was formed.

TABLE 3

Salt Composition in Aqueous Preparations

| Salts | Parts by Weight |
|---|---|
| $Ca(NO_3)_2 \cdot 4H_2O$ | 3.92 |
| $MgSO_4$ | 0.15 |
| NaCl | 4.58 |
| $NaNO_3$ | 0.74 |
| $FeCl_3$ (50%) | 0.01 |
| $K_2CO_3$ | 0.02 |
| Sodium Dodecyl Sulfate (SDS) | 0.01 |

Then designated amounts of Texas crude oil ("Texas Raw Crude Oil", obtained from Texas Raw Crude, Midland, Tex.) were slowly added to the feed tank to attain 0.125%, 0.25%, 0.50%, and 0.75% by weight of crude oil content respectively. The preparation was maintained by continuous stirring with an air driven motor during the cross-flow separation test described below.

Part IIIB: Cross-Flow Separation Test

The water flux testing on the microporous membranes was carried out with the four concentrations of crude oil/water preparation described above. For each test, the membrane effective area was 42 cm². The apparatus was plumed with 4 cells in parallel test lines. Each cell was equipped with a valve to turn the feed flow on or off and regulate the flow rate, which was set to 1.5 GPM (gallon per minute) in all tests. Pressure gauges were located at the inlet and outlet of the apparatus. The pressure was maintained at 15 psi trans membrane pressure (TMP). The test apparatus was equipped with a temperature controller to maintain the temperature 25±2° C. and the results were reported as gallons/(ft²×psi×day). i.e., 24 hours (GFD/psi). The permeate sample was collected after 30 min. of testing. The oil content in the permeate was measured following EPA method 413.2. The oil retention rate (R) was determined using the following formula: $R = 100 \times (C_{feed} - C_{permeate})/C_{feed}$ wherein $C_{feed}$ is the concentration of oil in the feed stream and $C_{permeate}$ is the oil concentration in the permeate. The results for cross-flow separation tests at each crude oil concentration are shown in the following Tables 4, 5, 6, and 7 respectively.

TABLE 4

0.125% Aqueous Oil Cross-flow Separation

| Membrane | Flux (GFD/psi) | Turbidity[4] (NTU) | Oil Retention Rate (%) | Oil Concentration in the Permeate (ppm) |
|---|---|---|---|---|
| 1 | 18.83 | 1 | 99.7 | 3.6 |
| 2 | 5.88 | 2 | 99.5 | 6.1 |
| 4 | 24.08 | 1 | 99.8 | 3.2 |
| CE-5 | 16.83 | 4 | 98.8 | 15 |
| CE-6 | 1.96 | 4 | 99.3 | 9.0 |
| CE-7 | 5.60 | 9 | 96.6 | 43 |

[4]Turbidity was measured using a Model 2100AN Laboratory Turbidimeter purchased from Hach Company.

TABLE 5

0.25% Aqueous Oil Cross-flow Separation

| Membrane | Flux (GFD/psi) | Turbidity (NTU) | Oil Retention Rate (%) | Oil Concentration in the Permeate (ppm) |
|---|---|---|---|---|
| 1 | 11.21 | 5 | 99.2 | 19 |
| 2 | 5.88 | 1 | 99.7 | 7.6 |

TABLE 5-continued 0.25% Aqueous Oil Cross-flow Separation

| Membrane | Flux (GFD/psi) | Turbidity (NTU) | Oil Retention Rate (%) | Oil Concentration in the Permeate (ppm) |
|---|---|---|---|---|
| 3 | 3.88 | 2 | 99.8 | 4.5 |
| 4 | 15.0 | 1 | 99.9 | 3.3 |
| CE-5 | 15.69 | 5 | 98.8 | 29 |
| CE-6 | 0.84 | 7 | 99.0 | 25 |
| CE-7 | 2.69 | 6 | 96.4 | 89 |

TABLE 6

0.50% Aqueouse Oil Cross-flow Separation

| Membrane | Flux (GFD/psi) | Turbidity (NTU) | Oil Retention Rate (%) | Oil Concentration in the Permeate (ppm) |
|---|---|---|---|---|
| 1 | 8.40 | 10 | 98.9 | 28 |
| 2 | 3.92 | 5 | 99.2 | 20 |
| CE-5 | 12.33 | 20 | 98.6 | 35 |
| CE-6 | 0.45 | 17 | 99.0 | 25 |
| CE-7 | 0.50 | 16 | 96.2 | 95 |

TABLE 7

0.75% Aqueous Oil Cross-flow Separation

| Membrane | Flux (GFD/psi) | Turbidity (NTU) | Oil Retention Rate (%) | Oil Concentration in the Permeate (ppm) |
|---|---|---|---|---|
| 1 | 5.60 | 13 | 99.4 | 42 |
| 2 | 2.80 | 7 | 99.4 | 45 |
| CE-5 | 11.21 | 37 | 98.7 | 94 |
| CE-6 | 0.22 | N/A[5] | N/A[5] | N/A[5] |
| CE-7 | 0.28 | N/A[5] | N/A[5] | N/A[5] |

[5]Insufficient permeate collected.

Part IV: Oil/Water Cartridge Separation Test

Water flux testing was also carried out using 8040 spiral wound cartridges fabricated with an experimental membrane and with a polyacrylonitrile membrane as described below. An 8040 cartridge was fabricated with the membrane of Example 1, comprising an effective membrane active area of 275 ft², using a diamond feed spacer and thermoplastic netting outer wrap. This is presented as Example 8. For Comparative Example CE-9, a GE MW 8040C1066 cartridge was purchased from Lenntech By. This cartridge utilizes the ULTRAFILIC membrane demonstrated above as CE-6. Testing was performed on a crude oil/water preparation starting at 0.25% by weight of crude oil content.

Part IVA: Oil in Water Waste Stream Preparation

The aqueous oil preparation for the cartridge separation test was prepared in the same proportions as described in Part IIIA to obtain 300 gallons of solution and 0.25% by weight of crude oil content. The preparation was maintained by continuous stirring with an air driven motor during the cartridge separation test described below.

Part IVB: Cartridge Separation Test

Figure 2:
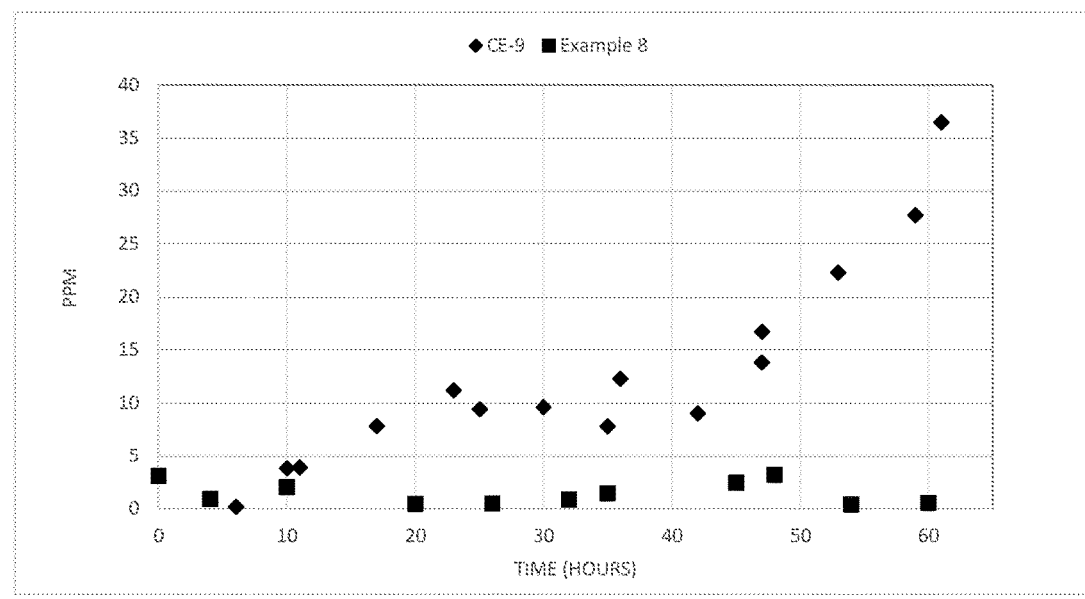
FIG. 2 is a plot of the oil concentration in the permeate of the experimental cartridge (Example 8) and the comparative cartridge (CE-9) disclosed herein.

The water flux testing on the microporous membranes was carried out with the experimental (Example 8) and comparative (CE-9) cartridges described above. The feed flow inlet was controlled at 90-105 Gal/min, and the cartridge transmembrane pressure (TMP) was maintained between 8-12 psi. The permeate flux rate was recoded with time and reported as Gal; min. The test was run approximately 12 continuous hours at a time, shutting down overnight. During the rest, both the solution in the permeate and the solution from the flow outlet flowed directly back into the 300-gallon tank. An additional 340 g of oil was added to the tank every 8 hours of service. The oil content in the permeate was measured following EPA method 413.2. The results for cartridge permeate rate and the oil concentration in the permeate are shown in FIG. 1 and FIG. 2.

The data in Tables 4 through 7 demonstrate the ability of the microporous membranes of the present invention to effect good removal of oil from permeate while maintaining good flux rates compared to commercially-available polyacrylonitrile and polyvinylidene difluoride membranes. The robustness of the inventive membranes is further demonstrated in commercial-type cartridge configurations in FIG. 1 and FIG. 2, where the commercial polyacrylonitrile cartridge CE-9 assembly shows reduced flow and decreased effectiveness in removing oil from the permeate over time compared to Example 8, the cartridge configured with the membrane of Example 1.

Whereas particular embodiments of this invention have been described above for purposes of illustration, it will be evident to those skilled in the art that numerous variations of the details of the present invention may be made without departing from the scope of the invention as defined in the appended claims.

What is claimed is:

1. A method of treating a hydrocarbon-containing waste stream comprising greater than 0 up to 2 percent by weight hydrocarbon to form an aqueous permeate which is substantially free of hydrocarbon and a hydrocarbon-containing retentate,
  wherein the method comprises passing the hydrocarbon-containing waste stream through a microporous membrane to yield the aqueous permeate and the hydrocarbon-containing retentate,
  wherein the membrane comprises a substantially hydrophobic, polymeric matrix and substantially hydrophilic, finely divided, particulate filler distributed throughout said matrix, wherein the polymeric matrix has pores with a volume average diameter less than 1.0 micron, and
  wherein at least 50 percent of the pores have a mean diameter of less than 0.35 micron.

2. The method of claim 1, wherein the membrane comprises at least 35 percent by volume of a network of interconnecting pores communicating throughout the membrane.

3. The method of claim 1, wherein the membrane is in the form of a sheet.

4. The method of claim 1, wherein the polymeric matrix has pores with a volume average diameter ranging from 0.03 to 0.5 micron.

5. The method of claim 1, wherein the finely divided, particulate filler comprises an inorganic filler material selected from the group consisting of silica, alumina, calcium oxide, zinc oxide, magnesium oxide, titanium oxide, zirconium oxide, and mixtures thereof.

6. The method of claim 5, wherein the finely divided, particulate filler comprises silica.

7. The method of claim 6, wherein the finely divided, particulate filler comprises precipitated silica present in the polymeric matrix in an amount ranging from 10 to 90 percent by weight.

8. The method of claim 1, wherein the polymeric matrix comprises polyolefin.

9. The method of claim 1, wherein the filler has been surface modified with functional groups that react with or adsorb one or more materials in the fluid stream.

10. The method of claim 9, wherein the filler has been surface modified with hydrophilic functional groups.

11. The method of claim 1, wherein the hydrocarbon-containing waste stream comprises 0.1 to 1.0 percent by weight hydrocarbon.

12. The method of claim 1, wherein the hydrocarbon-containing waste stream comprises 0.2 to 0.75 percent by weight hydrocarbon.

13. The method of claim 1, wherein the aqueous permeate contains less than 50 parts per million hydrocarbon.

14. The method of claim 1, wherein at least 55 percent of the pores have a mean diameter of less than 0.35 micron.

15. The method of claim 1, wherein said membrane is housed in a filter assembly.

16. The method of claim 15, wherein the filter assembly is selected from the group consisting of a pleated filter and a spiral crossflow filter.

\* \* \* \* \*